United States Patent
Martti et al.

(10) Patent No.: US 6,718,169 B1
(45) Date of Patent: Apr. 6, 2004

(54) METHOD FOR DETERMINING A CONFIDENCE LIMIT

(75) Inventors: Inka-Maarit Martti, Tampere (FI); Antti Lahnaoja, Düsseldorf (DE); Jari Suutarinen, Tampere (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/673,971

(22) PCT Filed: Feb. 24, 2000

(86) PCT No.: PCT/FI00/00153

§ 371 (c)(1),
(2), (4) Date: Jan. 8, 2001

(87) PCT Pub. No.: WO00/51381

PCT Pub. Date: Aug. 31, 2000

(30) Foreign Application Priority Data

Feb. 26, 1999 (FI) .................................................. 990417

(51) Int. Cl.$^7$ ................................................. H04Q 7/20
(52) U.S. Cl. .................... 455/424; 455/67.11; 455/423; 455/452
(58) Field of Search ................................ 455/422, 423, 455/424, 426, 445, 450, 451, 452, 452.2, 67.11; 379/27.08, 29.09

(56) References Cited

U.S. PATENT DOCUMENTS

| | | | |
|---|---|---|---|
| 5,095,500 A | | 3/1992 | Tayloe et al. |
| 5,513,185 A | * | 4/1996 | Schmidt ..................... 714/708 |
| 5,559,527 A | * | 9/1996 | Quinn ........................ 455/67.7 |
| 5,768,689 A | | 6/1998 | Borg |
| 6,381,306 B1 | * | 4/2002 | Lawson et al. ........... 379/32.01 |
| 6,442,151 B1 | * | 8/2002 | H'mimy et al. ............. 370/333 |
| 6,442,397 B1 | * | 8/2002 | Benveniste ................. 455/522 |
| 6,459,695 B1 | * | 10/2002 | Schmitt ....................... 370/344 |
| 6,539,205 B1 | * | 3/2003 | Wan et al. .................. 455/67.1 |
| 2001/0049263 A1 | * | 12/2001 | Zhang ........................ 455/67.1 |

FOREIGN PATENT DOCUMENTS

| | | |
|---|---|---|
| AU | A20078/97 | 11/1997 |
| AU | 2007897 | 11/1997 |
| EP | 0 734 193 | 9/1996 |
| EP | 0 734 193 A2 | 9/1996 |
| WO | WO 98/24222 | 6/1998 |
| WO | 98/24222 | 6/1998 |

* cited by examiner

Primary Examiner—William Trost
Assistant Examiner—James D Ewart
(74) Attorney, Agent, or Firm—Pillsbury Winthrop LLP

(57) ABSTRACT

A method for determining a confidence limit for a telecommunication network element, whereby the number of data transmission connections established through the network element is stored into a database and a relative value as a ratio of the number of faulty operations in the network element to the number of data transmission connections is determined. A variable describing the relative number of faulty operations is assigned a target value for which a confidence limit is set, the deviation of the confidence limit from the target value changing in proportion to the number of the data transmission connections. The deviation of the confidence limit in relation to the target value becomes either smaller, in response to an increase in the number of data transmission connections, or larger, in response to a decrease in the number of data transmission connections. The confidence limits of the telecommunication network element can be updated automatically.

9 Claims, 3 Drawing Sheets

METHOD FOR DETERMINING A CONFIDENCE LIMIT

FIELD OF THE INVENTION

The invention relates to a method for determining a confidence limit for telecommunication network elements, the method comprising the steps of: storing into a database the number of data transmission connections taking place through a network element during a predetermined period; determining a value for a variable describing the number of faulty operations in the network element in relation to the number of the data transmission connections; and setting a target value for the variable describing the relative number of faulty operations in the network element.

BACKGROUND ART

In large telecommunication networks, well-functioning network management systems are an important prerequisite for the reliability of network operations. The role of network management systems is particularly important in wireless telecommunication networks where the radio interface between a mobile station (MS) and a fixed network element, such as a base station (BTS), is usually the point where the data transmission connection is most unreliable and most susceptible to interference. As mobile communication networks become more common, increasing demands are naturally also set for extended coverage and higher capacity of the networks. This, in turn, increases the number of network elements managed by a network operator; large mobile networks may comprise several thousands of logical network elements.

This sets high requirements on the network management system. The network operator must be able to monitor and control the network capacity and the network elements preferably at one location. In addition, data on the network element operations, i.e. the load on the element, the types of data transmission that take place through the element, and any faults in the element, must be available at predetermined intervals. These data are stored into the database of the network management system and they are used for determining typical values for different indicators describing the operation of each element.

For poorly functioning network elements to be detected, the network operator sets threshold values for indicators describing various fault situations; depending on the indicator type, the indicator value may not be higher or lower than these threshold values in a normal situation. The accepted indicator values between the threshold values are referred to as the confidence interval. Separate confidence limits are defined for each indicator of each network element, and if the limits are exceeded, a notification is sent to the network management system. This allows different fault situations and poorly functioning network elements to be monitored.

SUMMARY OF THE INVENTION

A problem with the above arrangement is that the confidence limit to be set for each indicator is defined as a fixed value. At first, each network element type is typically given the same fixed confidence limit which the operator can change network-specifically, when needed. However, when a fixed confidence limit is used, special situations due to changes in traffic volumes cannot be taken into account. If a less busy network element is given the same confidence limits as a busy network element, even a minor exception from the normal number of faults may cause an error notification from the less busy network element because the number of fault situations is calculated as a percentage of the total traffic volume. Such an error notification is usually caused, more likely, by a statistical coincidence than a real failure in the network element. On the other hand, the setting of confidence limits separately for each network element and each hour is most laborious and requires detailed information about the different network elements and the traffic volumes transmitted through them.

An object of the invention is to provide a method allowing the above problems to be solved. The objects of the invention are achieved with a method which is characterized by setting a confidence limit to a target value, the deviation of the confidence limit from the target value changing in proportion to the number of data transmission connections.

According to a preferred embodiment of the invention, the target value is assigned a confidence limit, the deviation of the confidence limit from the target value becoming either smaller, due to an increase in the number of the data transmission connections, or larger, due to a decrease in the number of the data transmission connections. According to another preferred embodiment of the invention, data transmission connections taking place through the network element during a time unit are assigned a lower limit which must be exceeded before a confidence limit can be set for the target value. According to yet another preferred embodiment of the invention, for each hour of the day, a network-element-specific target value for a variable describing the number of faults in the network element and a confidence limit for the target value are determined, as well as a variable value describing the number of faulty operations in the network element per time unit during one hour.

The invention is based on setting a confidence interval for indicators describing faulty operations in the network elements, the length of the confidence interval being determined by the traffic volumes transmitted through the network element. Consequently, when the traffic volumes increase, the confidence interval becomes shorter, thus allowing quicker response to fault situations concerning busy network elements. When traffic volumes decrease, the confidence interval becomes longer which reduces the number of false alarms made by less busy network elements.

An advantage of the method of the invention is that it clearly improves the reliability of network management in the monitoring of network elements, because the confidence limits allow variations in traffic volumes to be taken into account better, which significantly reduces the number of false alarms. Furthermore, the method of the invention facilitates the operator's work because all the information needed for determining the confidence limits is obtained on the basis of statistical data collected into the database, thus allowing the confidence limits to be determined automatically, without the network operator being required to have detailed information about the operational circumstances of each network element. According to a preferred embodiment of the invention, no laborious changes are required in the network management system for modifying the updating interval of the data to be collected into the database; it is sufficient that the values of the indicators are measured after each monitoring period. Another preferred embodiment provides a further advantage in that the network operator is informed about fault situations in network elements quicker than before.

BRIEF DESCRIPTION OF THE DRAWINGS

In the following, the invention will be described in greater detail in connection with preferred embodiments and with reference to the accompanying drawings, in which.

DETAILED DESCRIPTION OF EMBODIMENTS

Figure 1:
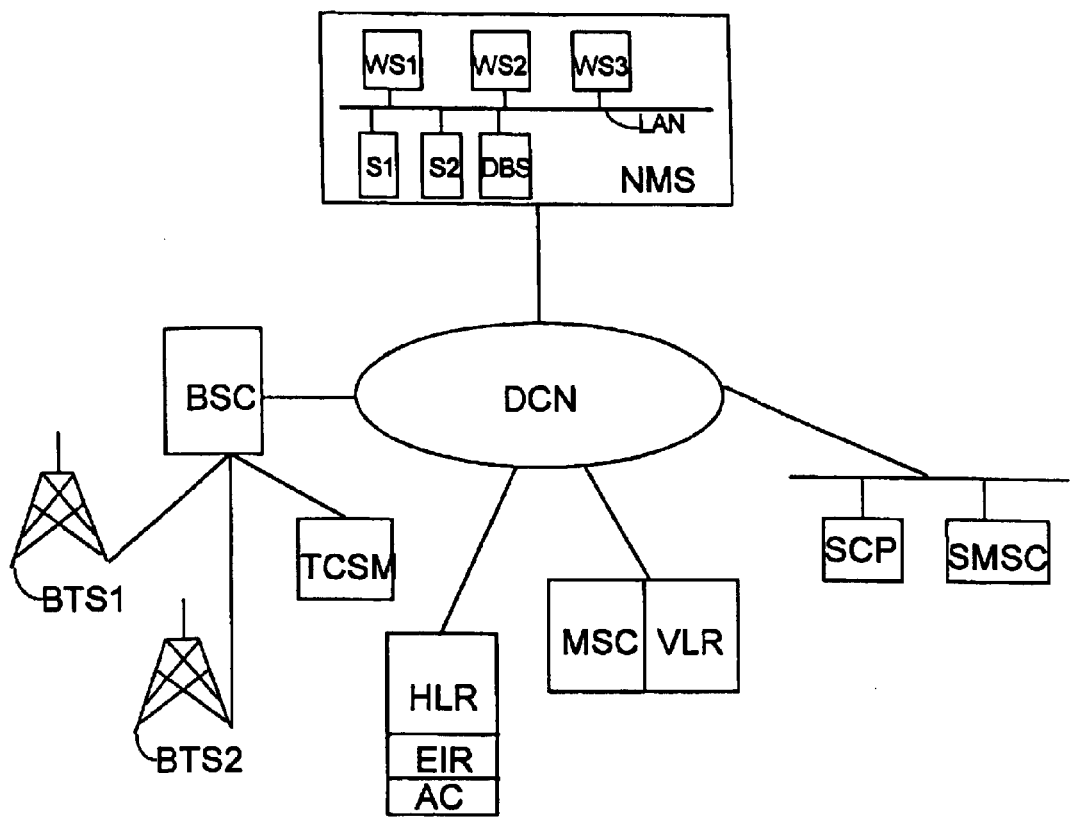
FIG. 1 illustrates a network management system of a telecommunication network and components belonging to the network.

With reference to FIG. 1, a typical network management system in a mobile communication network will be described in greater detail. The invention is not, however, limited to wireless telecommunication networks alone, but the method of the invention can be used in any telecommunication network.

FIG. 1 shows a typical centralized network management system (NMS) which communicates with different network elements through a data communication network (DCN). Prior art knows various ways of implementing the data communication network, for example as a circuit-switched PCM (Pulse Code Modulation) connection, packet-switched network or an OSI-type local area network. The network management system is used for controlling and monitoring mobile services switching centres (MSC) and visitor location registers (VLR) connected to them; home location registers (HLR), which typically also comprise an equipment identity register (EIR) and an authentication centre (AC); base station controllers (BSC); transcoders and sub-multiplexers (TCSM); and base stations BTS. In addition, the network management system may control network elements not actually belonging to the functions of a mobile communication network, for example a short message service center (SMSC) or a service control point (SCP) of an intelligent network. Thousands of different network elements may be controlled by the network management system NMS which usually comprises a plurality of servers (S1, S2) and workstations (WS1–WS3) providing the user interface. At least one server is typically reserved as a database server (DBS) for storing measurement data describing the operation of the network elements. The components of the network management system can be advantageously interconnected via for example a local area network (LAN).

In mobile communication networks, the most unreliable part in the data transmission connections is the radio interface between the mobile station MS and the base station BTS. It is therefore most significant for the network management that poorly functioning base stations can be detected as reliably and rapidly as possible. The operation of a base station can be monitored using various statistical indicators determined on the basis of the measurement data stored in the network management system. An example of these indicators is the dropped call ratio (DCR) to the total traffic volume of data transmission connections taking place via the base station. Hourly data on the operation of each network element can be collected into the database of the network management system during a statistically sufficient monitoring period, typically over several weeks. Each new measurement updates the indicator values, the oldest measurement result being dropped from the calculations and the latest one added in its place. This allows an indicator value based on moving average to be generated.

In the following, the invention will be described by way of example in association with the monitoring of base stations, although it is apparent to a person skilled in the art that the invention can be used for the monitoring of any network element. In this example of the application of the invention the aim is to detect poorly operating or faulty base stations among all base stations. The method is based on the fact that a certain percentage of calls taking place through a base station is unintentionally dropped for various reasons. This percentage is usually not constant, therefore, to allow statistically reasonable monitoring to be provided, a confidence interval is created within which the percentage must remain. If the relative number of dropped calls exceeds these limits, the operation of the base station can be considered to deviate from normal. The method of the invention can therefore be referred to as percentage interval estimation.

When the operation of base stations is being examined, the focus of interest is naturally that the number of dropped calls would not clearly exceed the normal values. A percentage of dropped calls which is smaller than normally does not usually cause problems for network management. Therefore, to simplify the description of the invention, only the forming of the upper confidence limit in the method of the invention will be discussed, although it is apparent that the lower confidence limit can also be determined by applying a similar method.

The first step in providing a statistically significant study of the DCR indicator of a base station is to make sure that a sufficient number of calls per time unit have taken place through the base station. This can be confirmed for example from the database of the network management system, the database comprising information about the operation of each network element, collected once an hour during a sufficiently long time period, usually over several weeks. If there are particularly few calls, less than 10 per hour for example, the reliability of the statistical analysis is impaired, and one dropped call alone can cause the value of the DCR indicator to rise very high.

The total number of calls per time unit can be determined by summing direct mobile-originated/mobile-terminated traffic channel allocations (Tch_norm_seiz, Traffic Channel Normal Seizure) of the mobile communication system and those taking place in a handover situation (Tch_ho_seiz, Traffic Channel Handover Seizure). According to a preferred embodiment of the invention, the upper confidence limit for the different indicators is determined according to formula 1:

$$UCL = p + z_{\alpha/2}\sqrt{p(100-p)/n} \qquad (1.)$$

wherein UCL=upper confidence limit p=threshold percentage in relation to which the confidence limit is calculated $z_{\alpha/2}$=coefficient for determining the length of the confidence interval n=total number of events.

The lower confidence limit can naturally be similarly determined for the indicators by applying a corresponding formula 2:

$$LCL = p - z_{\alpha/2}\sqrt{p(100-p)/n} \qquad (2.)$$

wherein LCL=lower confidence limit.

It is apparent to a person skilled in the art that indicators directly giving the number of fault situations, or other similar indicators, can also be used in the network management system, in addition to relative indicators. The formulas used for calculating confidence limits for these indicators differ from the above formulas in a manner known per se.

When the above formula 1 is applied to the example described earlier for determining the upper confidence limit for a base station, variable n represents the total number of traffic channel allocations mentioned above (Tch_norm_seiz+Tch_ho_seiz). At first the threshold percentage p is preferably the same for all the base stations, and when the mobile communications operator so desires, s/he may change the percentage for example on the basis of new forecasts regarding traffic volumes and capacity. The limit percentage p must be sufficiently close to the typical value of the DCR indicator to ensure that the observations concerning faulty operations are reliable. The coefficient $z_{\alpha/2}$ determining the length of the confidence interval is set using the network management system in a manner to be described below.

The value of the DCR indicator is calculated for each hour by retrieving the values needed in the calculation from the database of the network management system. At first, the number of dropped calls on the traffic channels in the data transmission connections established through the base station are calculated. The forming of the traffic channel all the way from the radio interface between the mobile station MS and the base station BTS to the mobile services switching centre MSC is taken into account in the calculation. The total number of dropped calls (Tch_fail_all) thus comprises all the faulty operations that have emerged at the base station BTS, base station controller BSC, transcoder TRSM and mobile services switching centre MSC, and at the interfaces between them. The value of the DCR indicator is calculated as the ratio of dropped calls to traffic channel allocations by applying formula 3:

$$DCR=100*Tch\_fail\_all/(Tch\_norm\_seiz+Tch\_ho\_seiz) \quad (3.)$$

According to a preferred embodiment of the invention, stricter confidence limits are set for busier base stations than for base stations with smaller traffic volumes. This compensates for any occurrence of statistical error in the error notifications and contributes to ensuring that error notifications are only created in real problem situations. Furthermore, it is important for the mobile operator to notice the faults in time, particularly when busy network elements are concerned. The confidence limits are set on the basis of traffic volumes by applying the constant coefficient $z_{\alpha/2}$. The value of the constant $z_{\alpha/2}$ can be advantageously determined on the basis of the average number of traffic channels used by the base station. A traffic indicator, for example, can be used for this purpose, the value of the indicator being determined as the average number of traffic channels used for an hour during several weeks. When the value of the traffic indicator is less than 1, for example, the constant $z_{\alpha/2}$ receives the value 3. On the other hand, if the traffic indicator value was higher than 10, the value to be set for the constant $z_{\alpha/2}$ could be for example 1. These are just examples of the values that the mobile operator can set, as needed, for the constant $z_{\alpha/2}$.

Figure 2:
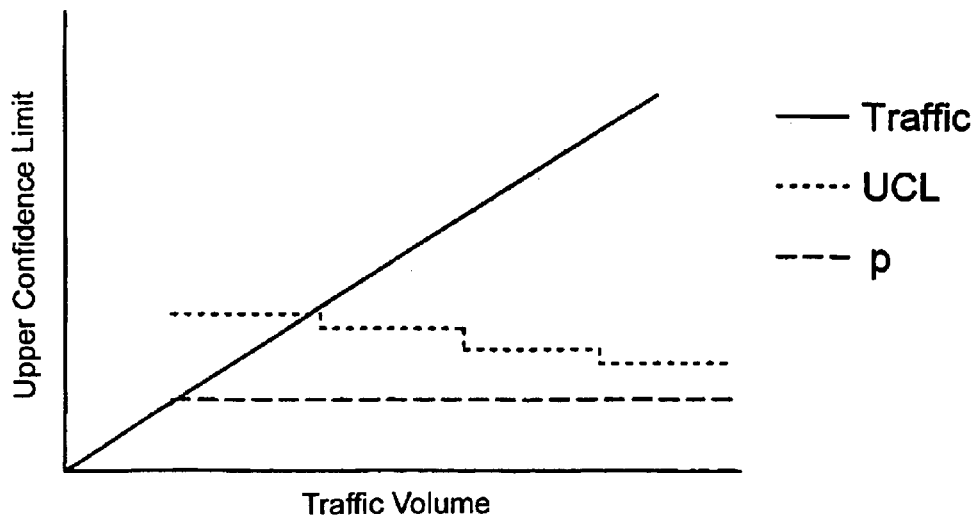
FIG. 2 is a line graph illustrating the formation of an upper confidence limit according to a preferred embodiment of the invention.

The line graph in FIG. 2 illustrates a principle for forming the upper confidence limit for the base stations having different traffic volumes. The increase in traffic volume is described with the Traffic indicator represented by a solid line of a constant slope starting from the origin. The threshold percentage p used for calculating the upper confidence limit is described in the graph with a broken line of a constant value. This can be considered to illustrate the target value of the DCR indicator (DCR_target) set at first for all base stations. However, since the real DCR indicator value to be measured is not constant, it can vary within the range defined by the upper confidence limit UCL, which is shown in the graph as a stepped line of dots. The width of the area between the upper confidence limit UCL and the threshold percentage p, i.e., the allowed upward variation range of the DCR indicator can be adjusted by changing the value of the constant $z_{\alpha/2}$. As shown in FIG. 2, with small traffic volumes the width of the area between the upper confidence limit UCL and the threshold percentage p is great. This is achieved by assigning the constant $z_{\alpha/2}$ a high value, for example 3, as in the example above. When the value of the traffic indicator exceeds a predetermined threshold value, the value of the constant $z_{\alpha/2}$ is reduced, for example to 2.5, which is shown in FIG. 2 by the stepwise decrease of the UCL value closer to the threshold percentage p. When the value of the traffic indicator further increases, the UCL value decreases stepwise always when the traffic indicator reaches a new predetermined threshold value. Consequently, during hours when the traffic volumes of the base station are particularly high, the allowed upward variation range of the DCR indicator is very small, and therefore even minor percentual deviations in the normal amount of dropped calls cause an alarm.

Figure 3A:
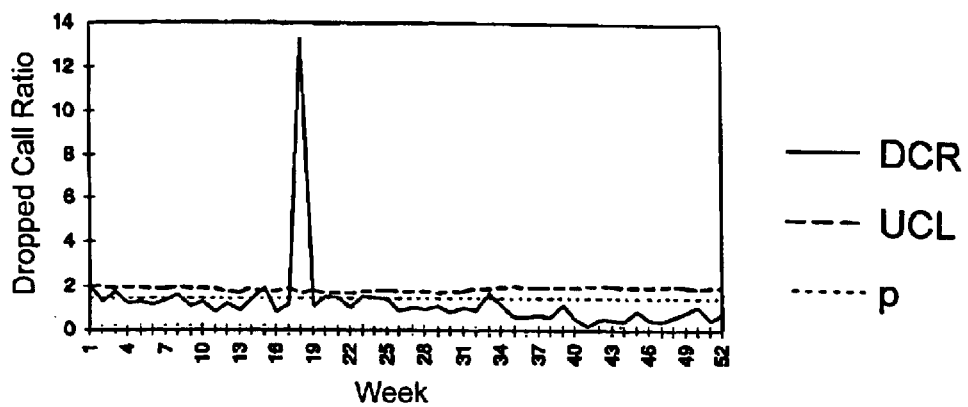
FIGS. 3a, 3b and 3c illustrate the formation of the upper confidence limit for network elements of different traffic volumes.
Figure 3B:
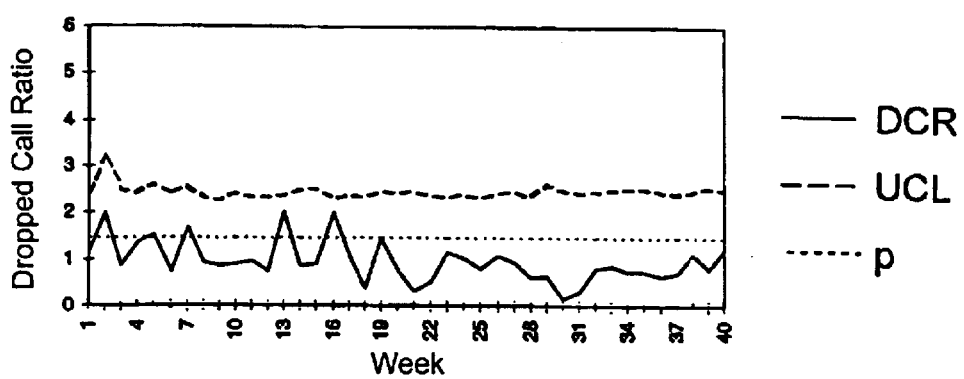
Figure 3C:
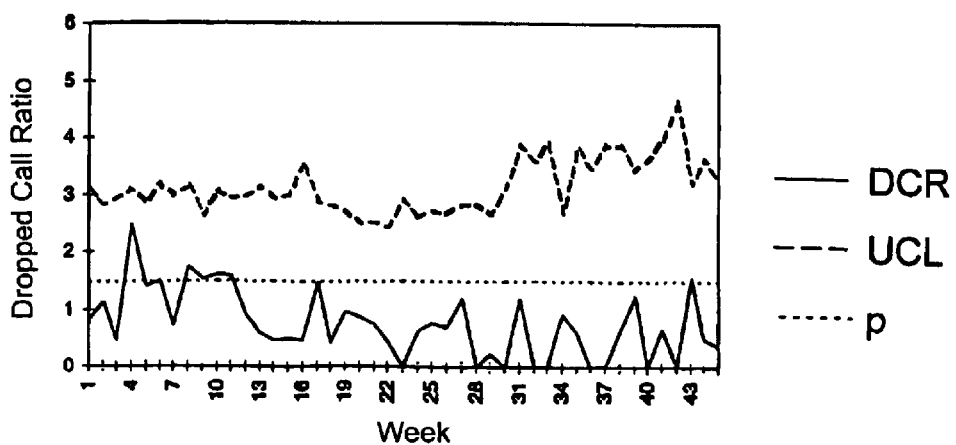

The forming of the upper confidence limit for base stations having differing traffic indicators is described, by way of example, with line graphs in FIGS. 3a to 3c. The vertical axis of the line graphs represents the dropped call ratio to all calls, and the horizontal axis describes the weekly measurements for a particular hour on a particular day. In all the Figures the threshold percentage p has been given the same value (1.5) to allow the differences in the formation of the upper confidence limit to be clearly shown. Let us study FIG. 3a which is an example based on measurement data of a base station which has a Traffic indicator of a relatively high value (about 9), i.e. the base station in question is fairly busy. The constant $z_{\alpha/2}$ therefore receives a small value, the upper confidence limit UCL thus being very close to the threshold percentage p, as defined by formula 1. Another reason for this is the high volume of traffic transmitted through the base station, the volume being represented in formula 1 by variable n. Every new measurement result updates the value stored in the database for the long-term average traffic volume. This can been seen as a slight variation of the upper confidence limit UCL around value 2 for the different weeks.

FIG. 3b illustrates a base station with a Traffic indicator value of about 4, i.e. the base station is clearly less busy than the one in the example of FIG. 3a. Compared with the example in FIG. 3a, the value of the constant $z_{\alpha/2}$ grows and, together with the smaller traffic volume, this results in a clearly higher value, about 2.5 on the average, for the upper confidence limit UCL. As defined in formula 1, a higher value of the constant $z_{\alpha/2}$ emphasizes more the weekly variation of traffic volumes, which is also shown as a greater variation in the values of the upper confidence limit. This is further emphasized in the graph according to FIG. 3c which illustrates a base station with a low traffic volume, the traffic indicator value of the base station being about 2.5. In this case the average upper confidence limit UCL is already about 3.5, which allows fairly large variations in the measured DCR indicator value without an error notification being generated.

FIGS. 3a to 3c illustrate clearly the advantages of the invention over prior art FIGS. 3a to 3c show one event where the dropped call ratio (DCR) becomes so high that a faulty operation at the base station has inevitably occurred. In FIG. 3a this is shown at week 18. Other variation shown in the DCR value of the Figures can be interpreted as a normal statistical variation. The method of the invention causes an alarm at the point mentioned, as possibly also at week 15 shown in FIG. 3a. Instead, if a fixed value, such as 2, was set for the upper confidence limit as in prior art, an alarm would be caused not only at the weeks mentioned above but also at weeks 2, 13 and 16 in FIG. 3b and at week 4 in FIG. 3c. All of these could, however, be interpreted as false alarms, except for the one caused at week 18 of FIG. 3a. The method of the invention thus clearly improves the reliability of network management in the monitoring of network elements. In addition, it facilitates the network operator's work because all the information needed for determining confidence limits is obtained from statistical data collected into the database, which allows the confidence limits to be determined automatically, and the network operator does not need to have detailed information about the operational circumstances of each network element.

Figure 4:
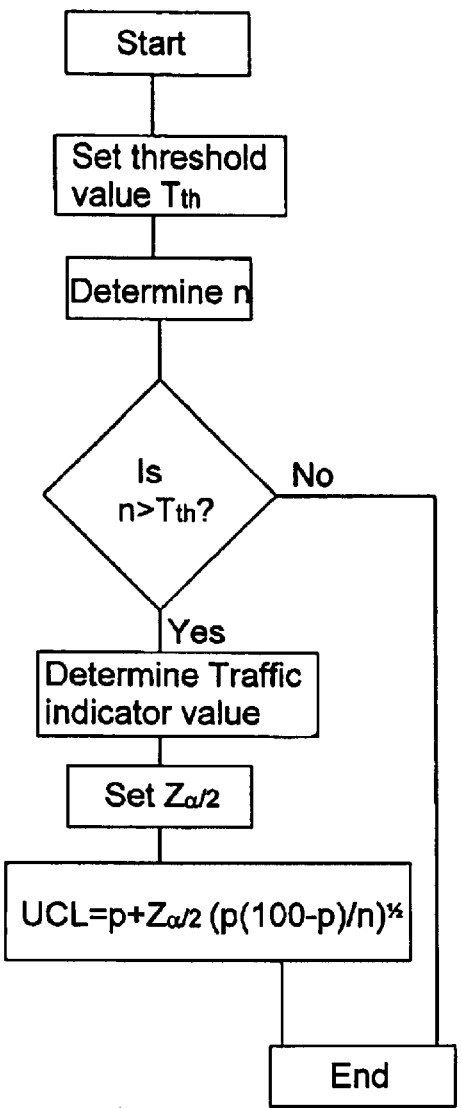
FIG. 4 is a flow diagram illustrating the formation of the upper confidence limit according to a preferred embodiment of the invention.

The setting of the upper confidence limit according to a preferred embodiment of the invention can be illustrated with a flow chart according to FIG. 4. The values of the constants and variables needed in the method are obtained from the network management system in the form of settings and statistical variable values stored in the databases. The network element is first assigned a threshold percentage p, in relation to which the confidence limit is determined. Similarly, a threshold value $T_{th}$ is set for the traffic channel allocations taking place through the network element in a time unit. For the confidence limit of the network element to be reliably determined, the threshold value must be exceeded. The real number n of traffic channel allocations in the time unit is compared with the threshold value $T_{th}$, and if the real value n does not exceed the threshold value $T_{th}$, the confidence limit is preferably not determined by applying the method of the invention. On the other hand, if the threshold value $T_{th}$ is exceeded, then the value of the Traffic indicator or another corresponding indicator expressing the traffic volume and determining the value of the constant $z_{\alpha/2}$ is checked. The indicator value is used for determining a value for the constant $z_{\alpha/2}$ which is used for calculating the upper confidence limit. The upper confidence limit is then determined on the basis of formula 1. The lower confidence limit can be similarly determined by applying formula 2.

In a preferred embodiment of the invention, the detection of fault situations in the network elements performed through the network management system can be speeded up by changing the monitoring period. The different indicator values are commonly measured once an hour and the measured value is compared with the confidence limits. If the indicator value exceeds the confidence limit, an alarm is sent to the network management system.

In the preferred embodiment of the invention, a monitoring period shorter than an hour, for example 15 minutes, is set. The number of fault events measured during this monitoring period are summed for one hour, i.e. when a monitoring period of 15 minutes is applied, the summing is made over four monitoring periods. According to the preferred embodiment of the invention, the sum is calculated after each monitoring period so that the latest value of the monitoring period is added to the sum and the earliest value is left out. When necessary, the sum is used for calculating a relative value for the indicator. A moving value is thus formed for the indicator, the value being updated after each monitoring period of, for example, 15 minutes. After each monitoring period, this moving value is compared with the set confidence limits, and when the indicator value exceeds the confidence limit, an error notification is sent.

Figure 5:
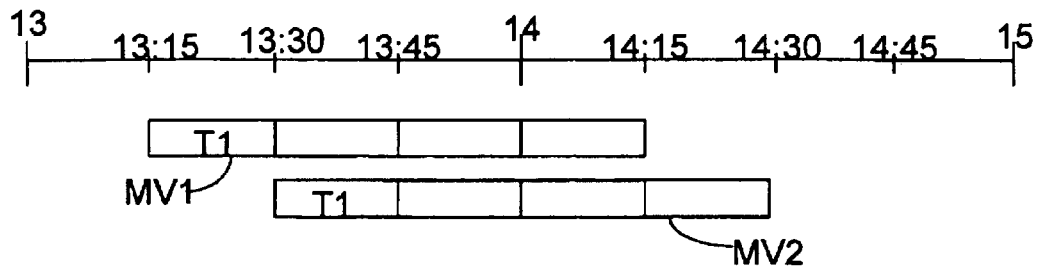
FIG. 5 is a line segment representing time and illustrating a comparison of a monitoring period to the confidence limits according to a preferred embodiment of the invention.

According to another preferred embodiment of the invention, hourly values, determined on the hour, can be set for the confidence limits, the moving value obtained after each monitoring period being then compared to the hourly confidence limits. This can be advantageously carried out for example by comparing the obtained moving value with the hourly value representing an hour that comprises most of the monitoring periods calculated into the moving value. This embodiment of the invention is illustrated in FIG. 5. In the method according to FIG. 5, a monitoring period of 15 minutes is applied, the moving value MV being formed for four monitoring periods. If a first monitoring period T1 of the moving value MV falls between the hour and the following half-hour, the moving value MV is compared with the hourly confidence limit value relating to the hour in question. For example in FIG. 5, the first monitoring period T1 of a moving value MV1 to be measured is from 1.00 p.m. to 1.15 p.m., or from 1.15 p.m. to 1.30 p.m., the moving value MV1 being compared with the confidence limits within the hour from 1.00 p.m. to 2.00 p.m. If the first monitoring value T1 of the moving value MV exceeds the following half-hour, the moving value MV is compared with the hourly confidence limit value of the following hour. In FIG. 5, for example, when the first monitoring period T1 of a moving value MV2 is between 1.30 p.m. and 1.45 p.m., the moving value MV2 is compared with the confidence limits within the hour from 2.00 p.m. to 3.00 p.m.

It is apparent that the above described monitoring period of 15 minutes is only one example of the preferred length of the monitoring period. Any time period divisible by 60 minutes can be advantageously selected as the monitoring period. An essential element in the embodiment of the invention is that the moving value is calculated over a time period of an hour, thus allowing the moving value to be directly compared with hourly indicator confidence limits maintained by the network management system. Laborious changes are therefore not needed in the network management system for modifying the updating interval of the data to be collected into the database. Instead, it is enough that the indicator values are measured after each monitoring period. This allows information about any fault situations in the network element to be more rapidly transmitted to the network operator than in hourly monitoring.

The above specification and the drawings only describe the invention by way of example, without restricting it to the example. It is apparent to a person skilled in the art that the invention can be applied to any other similarly functioning network, such as the public switched telephone network (PSTN). The invention can therefore be implemented in various ways within the scope of the accompanying claims.

What is claimed is:

1. A method for determining a confidence limit for telecommunication network elements, the method comprising:
   storing, into a database, a number of a plurality of data transmission connections taking place through a network element during a predetermined period,
   determining a value for a variable describing a number of faulty operations in the network element in relation to a the number of the plurality of data transmission connections;
   setting a target value for the variable describing the relative number of faulty operations in the network element;
   setting a confidence limit for the target value, a deviation of the confidence limit from the target value changing in proportion to the number of the plurality data transmission connections; and determining an upper confidence limit for the target value by applying a following formula:

$$UCL = p + z_{\alpha/2}\sqrt{p(100-p)/n}$$

wherein

UCL = upper confidence limit p = target value for which the upper confidence limit is determined $z_{\alpha/2}$ = coefficient for determining the deviation from the confidence limit n = number of data transmission connections, wherein the deviation of the confidence limit from the target value becomes either smaller, in response to an increase in the number of the plurality of the data transmission connections, or larger, in response to a decrease in the number of the plurality of the data transmission connections.

2. A method according to claim 1, further comprising:

setting a lower limit to the number data transmission connections taking place through the network element in a time unit, and setting a confidence limit to the target value, in response to the number of data transmission connections exceeding the lower limit.

3. A method according to claim 1, further comprising:

changing the value of coefficient $z_{\alpha/2}$ stepwise in response to the number of data transmission connections exceeding a predetermined value.

4. A method according to claim 1, further comprising:

determining a network-element-specific target value for each hour of a day and a confidence limit for the target value of the variable describing the relative number of faulty operations in the network element; and determining an hourly value for the variable describing the relative number of faulty operations per time unit in the network element.

5. A method according to claim 4, further comprising:

determining a value for the variable describing the number of faulty operations per time unit in the network element in periods shorter than one hour; and determining the value of the variable as a moving sum for an hour.

6. A method according to claim 1, further comprising:

sending an error notification to network management system in response to the variable value describing the relative number of faulty operations per time unit in the network element exceeding the confidence limit.

7. A method according to, claim 1, wherein the network element is a base station in a mobile communication network.

8. A method according to claim 1, further comprising:

updating variables and constants needed to determine the confidence limit automatically when data stored into a network management system change.

9. A method for determining a confidence limit for telecommunication network elements, the method comprising:

storing, into a database, a number of a plurality of data transmission connections taking place through a network element during a predetermined period;

determining a value for a variable describing a number of faulty operations in the network element in relation to a the number of the plurality of data transmission connections;

setting a target value for the variable describing the relative number of faulty operations in the network element;

setting a confidence limit for the target value, a deviation of the confidence limit from the target value changing in proportion to the number of the plurality data transmission connections; and determining a lower confidence limit for the target value by applying a following formula:

$$LCL = p - z_{\alpha/2}\sqrt{p(100-p)/n}$$

wherein

LCL = lower confidence limit p = target value for which a lower confidence limit is determined $z_{\alpha/2}$ = coefficient for determining the deviation from the confidence limit n = number of data transmission connections, wherein the deviation of the confidence limit from the target value becomes either smaller, in response to an increase in the number of the plurality of the data transmission connections or larger, in response to a decrease in the number of the plurality of the data transmission connections.

* * * * *